April 18, 1961    A. K. SCHOTT ET AL    2,979,905
PRESS CLUTCH

Filed July 6, 1959    3 Sheets-Sheet 1

Inventors
ARTHUR K. SCHOTT
CHARLES E. WILSON by Hill, Sherman, Meroni, Gross & Simpson Attys.

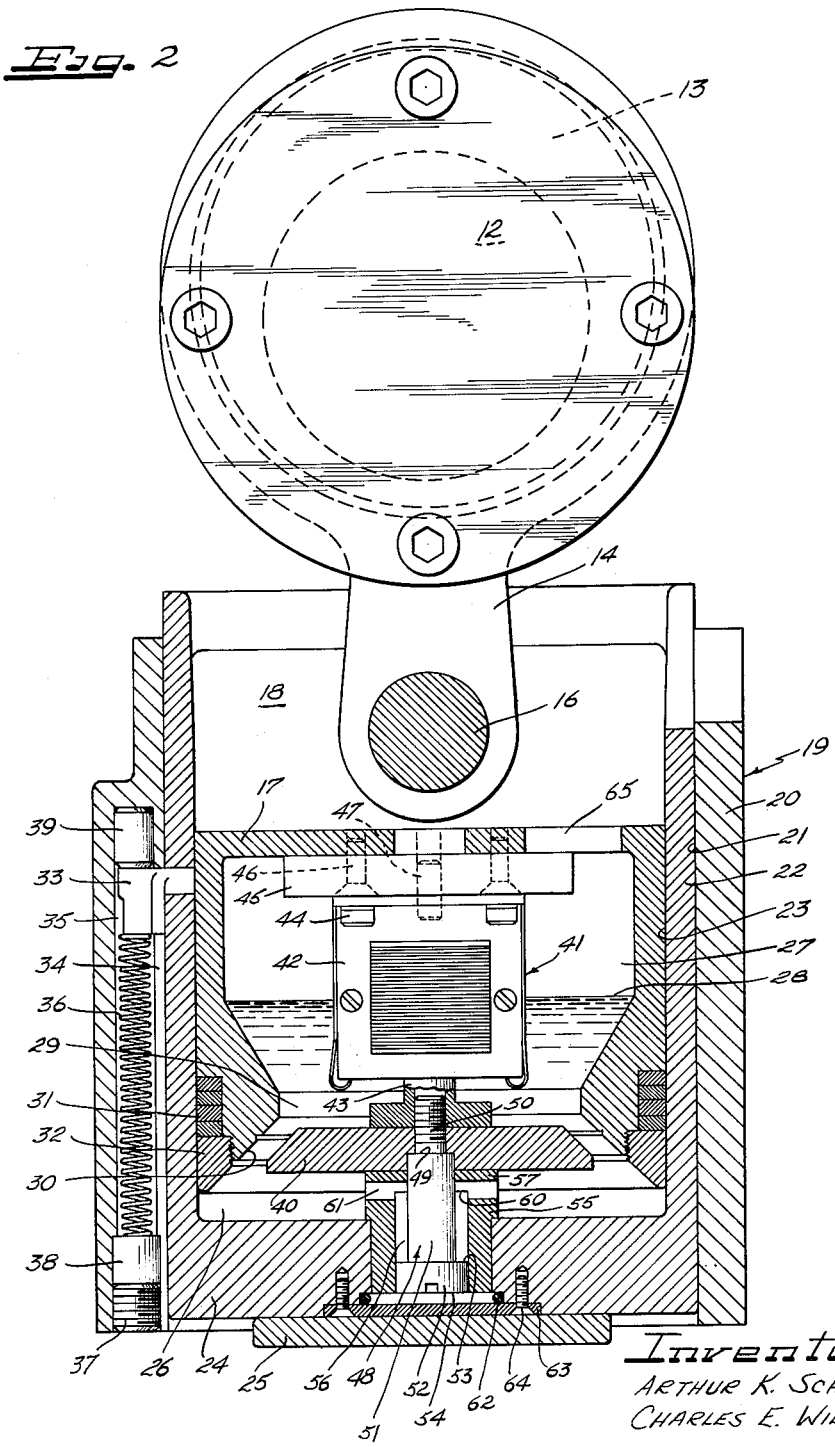

Inventors
ARTHUR K. SCHOTT
CHARLES E. WILSON

United States Patent Office 2,979,905
Patented Apr. 18, 1961

2,979,905

PRESS CLUTCH

Arthur K. Schott, Kenmore, and Charles E. Wilson, Tonawanda, N.Y., assignors to Houdaille Industries Inc., Buffalo, N.Y., a corporation of Michigan Filed July 6, 1959, Ser. No. 825,028

14 Claims. (Cl. 60—54.5)

This invention relates generally to a punch press, and more specifically to an improved clutch incorporated therein.

Although the principles of the present invention may be included in various mechanical devices employing reciprocating motion, a particularly useful application is made in a punch press. In particular, when a punch press is continually operated, or when it is operated in single stroke fashion, it is necessary to accelerate a relatively large mass. Various clutches have been previously suggested by prior inventors to reduce the amount of mass which must be so accelerated for each power stroke of the press. One such prior invention is disclosed in the patent to Wales No. 2,824,425 wherein a fluid clutch is employed, the clutch including a valve member which is mechanically positioned in valve closing and valve opening positions by a pneumatically actuated mechanical linkage. While such a structure is highly advantageous, it has the disadvantage that the valve actuating linkage is relatively complex.

The present invention deals with a press clutch which may be used in place of the one disclosed in the above-identified Wales patent. It will be noted that there is no external linkage provided in our improved clutch for actuating the valve member thereof, and that a new and novel mode of support of the valve element has been invented in order to implement the elimination of the external valve-actuating linkage thereof. In addition, an actuating means is provided within the clutch itself for moving the valve element, such actuating means being independently operable without utilization of reciprocation energy to power the actuating means within the clutch.

Accordingly, it is an object of the present invention to provide a reciprocating clutch of simplified structure.

Another object of the present invention is to provide a punch press employing a simplified reciprocating clutch mechanism.

Yet another object of the present invention is to provide a clutch which may be used in a punch press without the necessity for having a source of compressed air for actuating the clutch.

A still further object of the present invention is to provide a clutch having a clutch actuating means within the clutch powered by a source of energy other than the reciprocation of one of the clutch components.

Still another object of the present invention is to provide simplified control means for a reciprocable fluid clutch.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

In the drawings:

Figure 2 is a part front elevation, partly in section, showing the clutch of the present invention;

Figure 7:
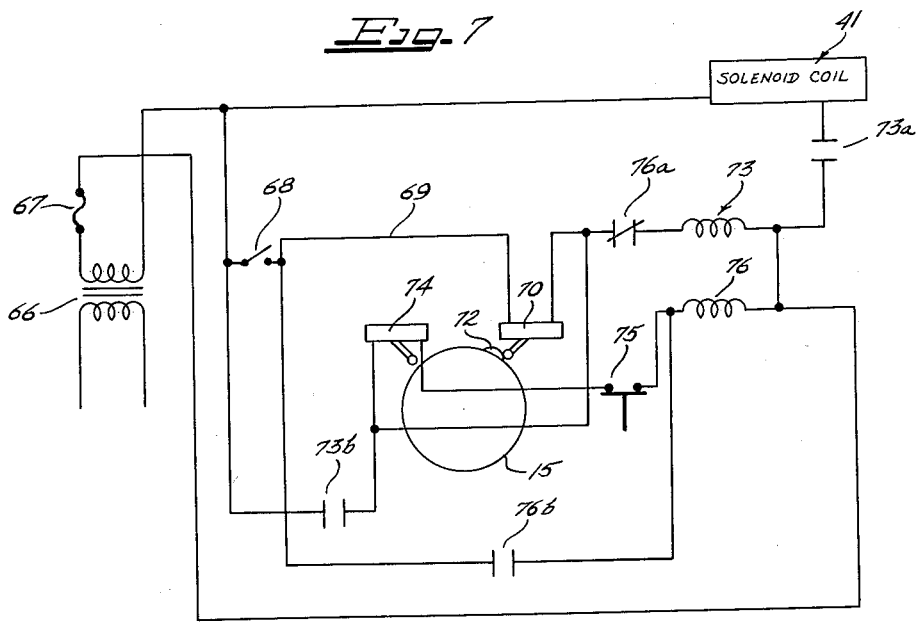
Figure 3:
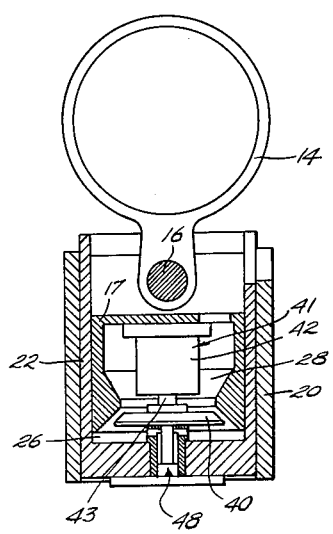
Figure 4:
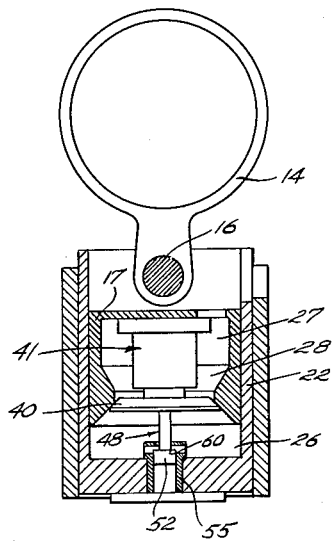
Figure 5:
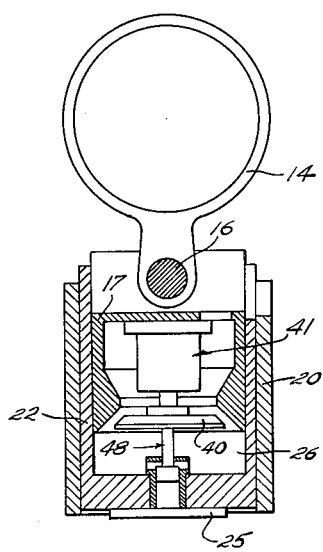
Figure 6:
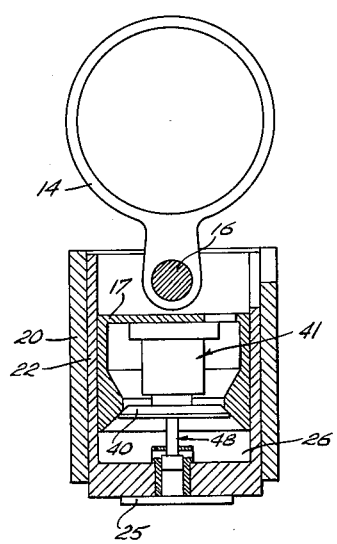

Figures 3–6, inclusive, are diagrammatic views illustrating the operation of the clutch mechanism shown in Figure 2, Figure 3 illustrating the piston at the bottom of the stroke during idling, Figure 4 illustrates a condition or relationship which exists just before and just after the power stroke has begun, Figure 5 illustrates the relationship of the parts at the beginning of a power stroke, and Figure 6 represents a power stroke; and Figure 7 is a diagram of the control circuit employed to operate the novel clutch of our invention.

Figure 1:
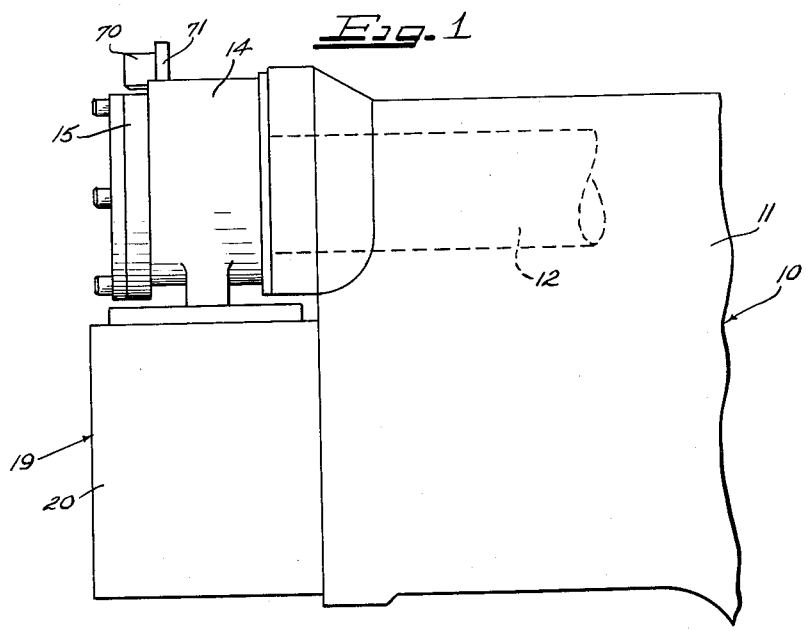
Figure 1 is a fragmentary side elevation of a punch press embodying the novel clutch of our invention.

As shown on the drawings:

The principles of this invention are particularly useful when embodied in a punch press shown fragmentarily and generally illustrated in Figure 1, identified by the numeral 10. The press has a frame 11 of a conventional type, and on which the power transmission device or clutch of the present invention is used. In this type of press, there is provided a rotary shaft 12 to which there is affixed an eccentric 13 which drives a pitman or link 14. Thus, the eccentric 13 and pitman 14 comprise means for connecting the clutch to the shaft 12. The shaft 12 is also provided with a cam 15, the use of which is explained below. The pitman 14 has an arm which is apertured to receive a pin 16, which pin 16 is drivingly connected to a hollow piston or guided driving element 17 having upstanding flanges 18 in which the pin 16 is also secured. As the shaft 12 rotates, the eccentric 13 and the pitman 14 act through the pin 16 to reciprocate the piston 17.

The press 10 includes a clutch mechanism generally indicated at 19, the piston 17 comprising one element of the clutch 19.

The clutch 19 includes a housing 20 which is removably secured as a unit to the frame 11 by any conveniently means. The housing 20 has a cylindrical bore 21 extending therethrough and providing a guide surface for a reciprocable cup-shaped cylinder or ram 22, which part or element is driven by the piston 17 in a manner to be explained herein. The cup-shaped cylinder has a cylindrical bore 23 which serves as a guide for the piston 17. The cup-shaped cylinder 22 is herein termed a "ram" for convenience when the clutch is embodied in a punch press. As a ram, the cylinder 22 is provided with a closed end 24 to which there is secured by any convenient means a tool or ram plate 25.

The cylinder 22 of course is hollow to receive the piston 17, and at its closed end 24 is provided with a fluid chamber 26. The piston 17 is likewise hollow and is also provided with a fluid chamber 27 in which there is disposed a liquid 28. The piston 17 and chamber 27 are open at one end 29, and at the open end 29, the piston 17 is provided with a valve seat 30 directed toward the chamber 26. The outside surface of the piston 17 slides in and is guided by the inside surface 23 of the cylinder 22. To insure that there is negligible leakage at this interface, the piston 17 is provided with a seal 31 therein, which seal is held in place by a ring 32 secured as by threads to the open end 29 of the piston 17.

To the cylinder or ram 22 there is secured a pin 33 which extends generally radially therefrom through a slot 34 in the inner wall of the housing 20. Adjacent to the slot 34 the housing 20 is provided with an opening 35 extending in parallel relation to the axis of the housing. The pin 33 extends into the opening 35 for reciprocation therein. Also disposed within the opening is a spring 36 which acts against the pin 33 to bias the cylinder or ram 22 in a return or upward direction. The spring is held in compression by means of a screw 37 acting through a bushing 38 on the spring 36. Preferably, there is also provided an anvil member 39 against which the pin 33 may impinge during upward movement. The anvil member 39 thus serves as a stop member and preferably comprises hardened material. Although only one ram or cylinder returning means is illustrated, it is to be understood that such number of these is provided about the periphery of the housing 20 as may be needed, four being used in an actual embodiment of this invention.

A valve 40 is carried in the ram or cylinder chamber 26, and is engageable with the valve seat 30 to form a fluid seal therebetween. To move the valve toward open and closed positions, there is also provided an electric solenoid 41, here shown to be of the laminated type having a first or field-forming portion 42 and a second or armature portion 43. The armature has a T-shaped configuration which preferably limits the movement of the armature 43 into the field-forming portion 42, comprising laminations and a coil. The field-forming portion 42 is secured as by bolts 44 to a mounting plate 45 which is in turn secured as by screws 46 to the lower surface of the upper end of the piston 17. If desired, a pin 47 may be employed to accurately locate the field-forming portion, and hence the armature 43, with respect to the piston 17. The valve 40 is secured to the T-shaped head of the armature 43 as by a retaining bolt generally indicated at 48.

The retaining bolt 48 has a shoulder 49 from which a threaded portion 50 extends. The threaded portion 50 is screwed into the armature 43, the valve 40 being clamped between the shoulder 49 and the T-shaped head of the armature 43. The retaining bolt 48 also has a shank portion 51 and a head portion 52. The head portion 52 has a pair of oppositely directed stop surfaces 53, 54, the surface 53 being engageable to limit upward movement of the valve 40 when orientated as shown, and the surface 54 being able to limit movement in the opposite direction. A guide bushing 55 preferably comprising hardened material is secured in the closed end 24 of the cylinder 22, such as by a press fit. The bushing 55 has an axial opening 56 which receives the head 52 of the retaining bolt 48. The guide bushing 55 has an inner end 57 which has an aperture through which the shank 51 of the retaining bolt 48 slidably extends and is thereby guided. The aperture 56 is in reality a counterbore, the bottom of which presents a surface 60 engageable with the surface 53 of the bolt head 52 to limit the relative upward movement of the valve 40 with respect to the closed end 24 of the cylinder 22. The guide bushing 55 is cross drilled as at 61 to preclude the possibility of hydraulic lock occurring in the aperture or guide way 56. The end 24 of the cylinder 22 is provided with a further pair of counnterbores, an O-ring seal 62 being disposed in one of them, and a stop plate 63 being disposed in the other. The plate 63 is secured as by screws 64 to the end 24 of the cylinder 22, the O-ring 62 forming a seal between the plate 63 and the end of the cylinder 22. As drawn, the upper surface of the guide bushing 55 is engageable with the lower surface of the valve 40, whereby the upper surface of the bushing 55 serves as a stop. It is apparent that the head 52 of the bolt 48 may also be sized and shaped to be used as a stop, engaging the plate 63.

The force of gravity acting on the armature 43, as well as on the valve 40 and the retaining bolt 48 provides a biasing force which continually acts on the valve 40 to urge it in an opening direction. In addition, the solenoid 41 may provide an additional bias in that the armature 43 is typically spring loaded from within the field-producing portion 42 as further assurance against sticking, and to shorten the time constant of the mechanism. It is thus seen that the valve 40 is disposed on the interior of the cylinder 22, and is supported by the cylinder 22. It is also seen that the retaining bolt 48 and the guide bushing 55 jointly comprise a lost motion connection between the valve and the closed end of the cylinder. On the other hand, the solenoid 41 is carried by and within the piston 17, and is disposed within the chamber 27 therein. The chamber 27 is vented as at 65. It is also apparent that any leakage past the seal 31 will tend to return through the vent opening 65 to the fluid chamber 27 in the piston 17.

The solenoid 41 can be electrically energized and de-energized at any desired moment, and the closing and opening of the circuit controlling the solenoid is independent of movement of any of the clutch elements within the housing. The solenoid 41 typically draws its armature 43 into the coil thereof, when energized, thereby drawing the valve 40 upwardly or outwardly of the cylinder 22 to engage the valve seat 30. When the solenoid 41 is de-energized, gravity acts to return the valve 40 in an inward direction towards the inner closed end of the cylinder 22. Thus, the solenoid 41 can effect movement of the valve 40 in either direction.

Referring now to Figures 3–6, the mechanical operation of the clutch will be explained. Figure 3 diagrammatically represents the relationship of the parts shown in Figure 2, it being somewhat simplified for purpose of clarity. Figure 3 represents an idling condition wherein the shaft 22 is rotating and hence wherein the pitman 14 is causing the piston 17 to continually reciprocate. While the piston 17 is thus under the influence of the eccentric, the ram or cup-shaped cylinder 22 is under the influence of the springs 36 shown in Figure 2, and is thereby being continually urged in an unward direction. The solenoid 41 is de-energized so that at least gravity is acting on the valve 40 to cause it to be positioned in a lowermost position. The lowermost position is determined by a stop which engages the valve 40 directly or which engages the retaining bolt 48. During the reciprocation of the piston 17, the field-forming portion of the solenoid 42 also reciprocates while the armature portion 43 remains stationary with respect to the valve 40. Thus, under this condition, the piston 17 reciprocates vertically within the cylinder 22 causing fluid to flow past the valve in a downward direction during upward movement of the piston, and in an upward direction during downward movement of the piston. This fluid flow is substantially free. During this idling type of reciprocation, there is always a clearance between the valve and the valve seat so that the free flow is assured. As drawn, the piston has a position representative of that which it has when the eccentric positions the piston to its lowermost or innermost position within the cylinder 22.

When it is desired to apply a power stroke with the ram or cylinder 22, the solenoid is energized, preferably when the parts are substantially related as shown in Figure 3. Such energization causes the solenoid 41 to draw the valve upwardly. However the solenoid 41 is also moving upwardly, so that the valve 40 tends to follow the solenoid coil 42 and eventually engage it.

If the valve 40 has seated during such upward movement, before the eccentric raises the piston 17 to its uppermost position, the retaining bolt head 52 will engage the stop surface 60 on the guide bushing 55 as shown in Figure 4 to thereby preclude further movement of the valve 40.

However, the shaft continues to drive the pitman 14 upwardly through the eccentric so that the piston 17 is raised from the valve 40 as shown in Figure 5, which represents the piston position at the uppermost end of every piston stroke. It is to be noted that the cylinder 22 is not yet moved. Now as the eccentric passes over center and begins its downward or power stroke, the valve seat re-engages the valve as shown in Figure 4 shortly after the power stroke has begun. At this re-engagement, the communication between the chambers 27 in the pistons 17 and 26 in the cylinder 22 is sealed off so that liquid is trapped below the valve in the cylinder chamber 26. Due to the substantially incompressible nature of the liquid 28, and since both the seal 31 and the valve 40 preclude escape of liquid from the chamber 26, the piston 17 acting through the entrapped liquid in the chamber 26 drives the cup-shaped cylinder or ram 22 in a downward direction as shown in Figure 6, the power stroke continuing to the lowest position permitted by the eccentric.

Assuming that the solenoid 41 be left energized, the relationship between the parts is maintained until the position shown in Figure 4 is again reached at which point the movement upwardly of the cylinder is arrested through the stop pins 33 shown in Figure 2, and the movement of the valve 40 is arrested by the bushing 55. As explained before, the piston 17 nevertheless continues in upward movement from that shown in Figure 4 and in cooperation with the cylinder 22 overpowers the solenoid to open the valve as shown in Figure 5 to admit such additional liquid to the chamber 26 as may be necessary for the next stroke. Since there is thus always a constant amount of liquid present in the chamber 26 during a power stroke, the length of successive power strokes is kept at a constant.

Continuous reciprocation of the ram 22 is desired under certain circumstances, for example when the ram 22 is employed through the tool plate 25 to operate a nibbling apparatus or to provide a continually operating press.

When it is desired to terminate the operation of the device, or when it is desired to impart but one power stroke, the solenoid 41 is de-energized at the proper time. Preferably, the solenoid 41 is de-energized just after the last power stroke has begun. The trapped fluid in the chamber 26 is under a good deal of pressure provided by the reactive force from the object being worked upon by the ram 22. This pressure acts against the lower surface of the valve 40 and holds it in closed sealed position against the force of gravity until the bottom of the stroke is reached. At this point, an equilibrium condition will arise which permits gravity to draw the valve 40 in a downward direction.

It is thus apparent that the open end of the piston 17 confronts and selectively communicates at one end which is nearest to the closed end of the ram with the fluid chamber of the ram 22. Also, when the valve is open or in a downward position, the device is in an idling condition wherein free flow can occur through the open end of the valve, whereby there is no driving force imparted by the piston to the cylinder. Any friction between these two components is more than overcome by the springs 36. Under this condition, the valve seat is always open, there being a clearance at the bottom of the stroke to insure this relationship. The downward movement of the valve 40 is thus also limited by certain engagement means to be in a standby position, engagement means thus also being provided to limit upward movement to insure that the valve will always be open, even when the solenoid is energized, at the upper end of every piston stroke.

While the operation of the solenoid 41 is generally synchronized with the movement of the piston 17, it is apparent that it does not receive any valve raising or lowering power directly therefrom. To control the solenoid 41, a circuit is employed such as shown in Figure 7. Control power is furnished from a transformer 66 and is directed through a fuse 67 to one side of a foot-operated switch 68. When it is desired to initiate a stroke of the press, the foot-operated switch 68 is depressed and held closed. This permits the circuit to be completed through a line 69 to a limit switch 70 which may be carried on a bracket 71 such as shown in Figure 1. The cam 15 then continues to be rotated by the shaft 12 until the cam rise 72 causes the normally open switch 70 to momentarily close. Closing of the switch 70 permits current to pass through a relay coil 73 which closes contacts 73a to complete the circuit to the solenoid coil.

At the same moment that the relay coil 73 becomes energized, a second set of contacts 73b also becomes closed which are connected across the foot switch 68 and the limit switch 70 as a holding circuit. Once the relay coil 73 has been energized and the contacts 73b closed, the foot switch 68 may be released if desired.

Closing of the relay contacts 73b also brings power to a second switch 74 also engageable with the cam rise 72. When the cam rise 72 engages the normally open switch 74 to momentarily close it, a circuit is completed through a manually operable normally closed switch 75 to the coil of a second relay 76. When the second relay is energized, it opens a pair of normally closed contacts 76a which are disposed in the holding circuit to the coil 73. Thus the closing of the second relay 76 opens the circuit to the relay 73 which provides power to the solenoid coil 41, thereby effecting opening of the circuit and deenergization of the solenoid 41.

In order that continued depression of the foot switch 68 will not automatically initiate a second stroke, a second set of contacts 76b is provided in the relay 76 and connected from one side of the foot switch 68 to the coil of the relay 76 to serve as a holding circuit so that once the coil 76 has been energized, and the circuit to the coil 73 broken, power is provided through the contacts 76b from the foot switch 68 to insure that the solenoid-deenergizing relay 76 remains energized until after the foot switch 68 has been released.

If a single stroke operation is not desired, the normally closed switch 75 may be manually opened to allow continuous operation. This switch being located in the circuit which initially causes the closing of the solenoid-deenergizing relay coil 76, the relay 73 will remain closed and the press will continue to reciprocate indefinitely until the switch 75 has been reclosed. Thus to use the device as a nibbling mechanism, the switch 75 is first opened, then the foot switch 68 is depressed, and nibbling will continue until the switch 75 is manually reclosed. It is apparent therefore that means are provided for disabling the shut-off mechanism to effect nibbling, and that the shut-off mechanism or circuit comprises a means for disabling the normal power-supplying circuit to terminate a stroke.

The location of the cam rise 72 with respect to the switches 70 and 74 in an actual embodiment is such that the switch 70 will ordinarily be closed to energize the solenoid 41 when the piston 17 is at the bottom of its stroke, and is so located that the cam rise 72 will close the switch 74 immediately after the power stroke has been initiated. Of course, it can be seen that the switch 74 may be closed at any time during the power stroke to terminate reciprocation of the ram subsequently to said power stroke. Once the solenoid has been deenergized or energized, the clutch operates as already described herein. Therefore, the cam 15 is operative through the control means to energize the solenoid to begin to effect valve closing when the piston is at the innermost or lowermost portion of its stroke, and the cam is operative through control means to deenergize the solenoid during the power stroke, such control means being selectively operable to make the valve-closing means inoperative.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A clutch comprising a reciprocable hollow cylinder, a piston reciprocable in said cylinder and guided by said cylinder in its reciprocation, said piston being hollow and having a chamber formed therein confronting and communicating with the interior of said cylinder, said chamber and the interior of said cylinder being adapted to contain a liquid, and a valve mounted in said cylinder to reciprocate relative to said piston independently of the reciprocation of said piston but in the direction of reciprocation of the piston, said valve being freely movable downwardly in response to gravity to open position to allow free flow of the liquid between said piston and said cylinder so that said piston may reciprocate relative to said cylinder without driving said cylinder, said valve at the lower end of its stroke being displaced from said piston at the lower end of the piston's stroke whereby said valve will remain open despite the reciprocation of said piston, means disposed entirely within and carried by said piston for moving said valve upwardly to a closing position, means carried by said cylinder and said valve for limiting the upward movement of said valve at the upper end of its closing stroke so that said valve is offset downwardly from the piston at the upper end of the piston's stroke whereby said valve opens at the upper end of the piston stroke even when the valve is in closing position, whereby said valve will not close until the piston has moved some distance on its next downward stroke.

2. In a punch press, a rotary shaft, a reciprocable tool-carrying ram constituting a first reciprocating part, said ram being hollow and having a chamber formed therein, a piston reciprocable in said ram chamber and constituting a second reciprocating part, means connecting said piston to said shaft to reciprocate said piston on rotation of said shaft, said piston being hollow and having a chamber formed therein adapted to contain a liquid and to communicate with the first-named chamber, and a valve reciprocably supported within one of said reciprocable parts to move it from open to closed position, and vice versa, and operative when in closed position to seal off communication between said chambers to entrap liquid between said piston and said ram to cause said piston to drive said ram through the entrapped liquid, said valve when open permitting the liquid to flow freely between said chambers whereby said piston may reciprocate in said cylinder without transmitting motion to said cylinder, and an electric solenoid disposed within one of said reciprocable chambers and connected to said valve, the energization of said solenoid being controlled by said shaft for controlling the position of said valve.

3. In a punch press, a rotary shaft, a reciprocable tool-carrying ram, a piston reciprocable in said ram, means connecting said piston to said shaft to reciprocate said piston on rotation of said shaft, said ram being closed at one end and being open at its other end and having a chamber formed therein, said piston having a chamber formed therein confronting the chamber in said ram and being open at the end thereof which is proximal to the closed end of said ram thereby to permit communication between said chambers, said chambers containing a liquid, a valve in one of said reciprocable members to reciprocate relative thereto, said valve being biased toward the open position by gravity, a solenoid secured to one of said reciprocable members and to said valve for moving said valve from an open position toward a closing position, and means on said ram and said valve for limiting the movement of said valve toward opening position so that said valve is displaced from said piston at the end of the piston stroke on which the piston approaches the closed end of said ram, and means on said ram and said valve for limiting the amount of the closing movement of said valve whereby said valve remains open at the receding end of the piston stroke and is not closed until the piston has moved some distance on its next approaching stroke, said valve when closed shutting off communication between said chambers and entrapping liquid between said piston and said ram so that said piston may drive said ram in one direction, said valve when open permitting free flow of liquid between said chambers so that said piston may reciprocate relative to said ram without driving said ram, means operable by said rotary shaft in its rotation for energizing said solenoid, and selectively operable electrical means for rendering the last named means inoperative.

4. A clutch comprising a driving element and a driven element, one of said elements being a reciprocable piston and the other of said elements being a reciprocable cylinder in which said piston reciprocates and in which it is guided in its reciprocation, said piston being hollow and having a chamber formed therein for liquid, and said cylinder being hollow to provide a second chamber confronting the chamber of said piston, and a valve carried by and disposed within said driven element and controlling communication between said chambers, said valve being movable in one direction independently of the stroke of said elements to close off said communication to entrap liquid between the piston and the cylinder to cause one to drive the other, and said valve being movable in the opposite direction independently of the stroke of said elements to establish said communication so that said cylinder and said piston may move relatively to one another without one driving the other, and means carried by and disposed entirely within said driving element for moving said valve in both said one direction and said opposite direction in said driven element.

5. A clutch comprising a reciprocable cylinder and a piston reciprocable therein, said piston being hollow and having a chamber therein confronting and communicating with the interior of said cylinder, said piston having a valve seat at its inner end, a valve adapted to seat on said valve seat thereby to seal off said chamber from the interior of said cylinder and to entrap liquid between said piston and cylinder whereby said piston will drive said cylinder through the entrapped liquid, said valve being mounted on said cylinder for movement coaxially thereof toward and away from its seat, means carried by said piston for moving said valve from its seat to open position, said valve being constantly urged away from said seat, and means carried by said cylinder for limiting the movement of the valve in both directions whereby the outer limit of movement of the valve is spaced inward of the outer limit of movement of the piston, and whereby the inner limit of movement of the valve is spaced inward of the inner limit of movement of the piston so that when said valve is in open position said piston may reciprocate in said cylinder without transmitting motion to said cylinder.

6. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston having a chamber formed therein adapted to contain a liquid and communicate with the first-named chamber, and a valve mounted reciprocably on said ram for sealing off communication between said chambers to entrap liquid between said piston and said ram to cause said piston to drive said ram through the entrapped liquid, said valve being reciprocable in said ram in the direction of reciprocation of said piston, means for resiliently biasing said valve toward open position, and operative to selectably position said valve in closed position, said valve when open permitting free flow of liquid between said chambers so that said piston may reciprocate in said ram without transmitting motion to said ram, and means actuated by said shaft for controlling opening of said valve after the ram has completed a working stroke.

7. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston being hollow and having a chamber formed therein adapted to contain a liquid and to communicate with the first-named chamber, and a valve mounted reciprocably on said ram for sealing off communication between said chambers to entrap liquid between said piston and said ram to cause said piston to drive said ram through the entrapped liquid, said valve being reciprocable in said ram in the direction of reciprocation of said piston, means carried by said piston for positioning said valve toward closed position, and means operated by the shaft during the working stroke to cause said last-named means to permit said valve to move to open position after the working stroke.

8. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston being hollow and having a chamber formed therein adapted to contain a liquid and to communicate with the first-named chamber, and a valve mounted reciprocably on said ram for sealing off communication between said chambers to entrap liquid between said piston and said ram to cause said piston to drive said ram through the entrapped liquid, said valve being reciprocable in said ram in the direction of reciprocation of said piston, means carried by said piston for moving said valve toward closed position, and means operated by said shaft during the working stroke to cause said valve-moving means to permit said valve to move to open position after the working stroke, said last-named means being selectably positionable in inoperative position to permit continued reciprocation of the ram, and means for returning the ram to its starting position on completion of each working stroke.

9. A clutch comprising in combination: a housing having a cylindrical bore; a generally cup-shaped cylinder reciprocably guided in said cylindrical bore and adapted to be partially filled with a fluid; a hollow piston adapted to be reciprocably driven, said piston being guided by and disposed within said cup-shaped cylinder; means movably carried by and disposed within said cup-shaped cylinder and movable to positions which effect driving engagement through the fluid and non-driving relation between said cup-shaped cylinder and said piston; and means carried by and disposed entirely within said piston and connected to said last-named means for effecting the movement thereof independently of reciprocation of said piston.

10. A fluid clutch comprising in combination: a housing having a cylindrical bore; a generally cup-shaped cylinder reciprocably guided in said cylindrical bore, and having a closed end defining a fluid chamber therein; a hollow piston having a fluid chamber communicating fluidly at one end with said first-named chamber, said piston being guided by and within said cup-shaped cylinder, and adapted remotely from said one end to be reciprocably driven; valve means disposed in said cylinder chamber and having a lost motion connection with said cylinder, said valve being movable to block off the fluid communication between said chambers; and a solenoid disposed in said piston chamber, and having a first portion thereof secured to said piston and a second portion thereof movable relatively to said first portion in response to energization of said solenoid, said second portion being drivingly connected to said valve to effect positioning thereof.

11. A fluid clutch comprising in combination: a housing having a cylindrical bore; a generally cup-shaped cylinder reciprocably guided in said cylindrical bore, and having a closed end defining a fluid chamber therein; a hollow piston having a fluid chamber communicating fluidly at one end with said first-named chamber, said piston being guided by and within said cup-shaped cylinder and adapted remotely from said one end to be reciprocably driven; valve means disposed in said cylinder chamber and having a lost motion connection with said cylinder, said valve being movable axially thereof to engage said piston in a manner to block off the fluid communication between said chambers; and a solenoid disposed in said piston chamber, and having a field forming portion thereof secured to said piston, and an armature portion thereof movable relatively to said field forming portion in response to energization of said solenoid, said armature portion being drivingly connected to said valve to effect positioning thereof.

12. A fluid clutch comprising in combination: a housing having a cylindrical bore; a generally cup-shaped cylinder reciprocably guided in said cylindrical bore, and having a closed end defining a fluid chamber therein; a pair of spaced stops directed toward each other and carried by said closed cylinder end within said cylinder chamber; a hollow piston having a fluid chamber communicating fluidly at one end with said first-named chamber, said piston being guided by and within said cup-shaped cylinder, and adapted remotely from said one end to be reciprocably driven; a valve disposed within said cylinder chamber; means secured to said valve and extending between said spaced stops on said cylinder for alternative engagement therewith, said valve being movable to engage said piston in a manner to block off the fluid communication between said chambers; and means carried by and disposed within said piston and connected to said valve for effecting movement of said valve independently of reciprocation of said piston.

13. In combination in a punch press: a rotary shaft; a reciprocable generally cup-shaped ram having a closed end defining a fluid chamber therein; a hollow piston having a fluid chamber communicating fluidly at one end with said first-named chamber, said piston being guided by and within said cup-shaped ram, and adapted remotely from said one end to be reciprocably driven; valve means disposed in said ram chamber and having a lost motion connection with said ram, said valve being movable axially thereof to engage said piston in a manner to block off the fluid communication between said chambers; a solenoid disposed in said piston chamber, and having a first portion thereof secured to said piston, and a second portion thereof movable relatively to said first portion in response to energization of said solenoid, said second portion being drivingly connected to said valve to effect positioning thereof; and means for energizing said solenoid to effect movement of said valve in a closing direction when said piston is substantially at its innermost position within said ram.

14. In combination in a punch press: a rotary shaft; a reciprocable generally cup-shaped ram having a closed end defining a fluid chamber therein; a hollow piston having a fluid chamber communicating fluidly at one end with said first-named chamber, said piston being guided by and within said cup-shaped ram, and adapted remotely from said one end to be reciprocably driven; valve means disposed in said ram chamber and having a lost motion connection with said ram, said valve being movable axially thereof to engage said piston in a manner to block off the fluid communication between said chambers; a solenoid disposed in said piston chamber, and having a first portion thereof secured to said piston, and a second portion thereof movable relatively to said first portion in response to energization of said solenoid, said second portion being drivingly connected to said valve to effect postioning thereof; means for energizing said solenoid to effect movement of said valve in a closing direction when said piston is substantially at its innermost position within said ram; and other means for deenergizing said solenoid while said ram is being fluidly driven in a power stroke by said piston.

References Cited in the file of this patent

UNITED STATES PATENTS

| | | |
|---|---|---|
| 2,227,279 | Smith | Dec. 31, 1940 |
| 2,824,425 | Wales | Feb. 25, 1958 |